US011232490B1

(12) United States Patent
Paran et al.

(10) Patent No.: US 11,232,490 B1
(45) Date of Patent: Jan. 25, 2022

(54) SYSTEM, METHOD, AND COMPUTER PROGRAM FOR SERVING ONLINE CONTENT TO USERS BASED ON REAL WORLD USER INFORMATION

(71) Applicant: Amdocs Development Limited, Limassol (CY)

(72) Inventors: Eran Yosef Paran, Hod Hasharon (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 13 days.

(21) Appl. No.: 16/053,663

(22) Filed: Aug. 2, 2018

(51) Int. Cl.
*G06Q 30/02* (2012.01)
*H04L 29/08* (2006.01)
*G06F 16/955* (2019.01)

(52) U.S. Cl.
CPC ....... *G06Q 30/0275* (2013.01); *G06F 16/955* (2019.01); *H04L 67/12* (2013.01)

(58) Field of Classification Search
CPC ........... G06Q 30/0275; G06Q 30/0273; G06Q 30/0261; G06F 16/955; H04L 67/12
USPC ................................ 705/14.71, 14.69, 14.58
See application file for complete search history.

(56) References Cited

U.S. PATENT DOCUMENTS

| 2002/0062249 | A1* | 5/2002 | Iannacci | G06Q 20/105 705/14.1 |
| 2006/0063594 | A1* | 3/2006 | Benbrahim | G07F 17/3223 463/42 |
| 2011/0004615 | A1* | 1/2011 | Counterman | G06F 16/9577 707/769 |
| 2012/0063651 | A1* | 3/2012 | Pennington | G07F 17/32 382/118 |
| 2013/0103939 | A1* | 4/2013 | Radpour | H04W 12/04 713/152 |

(Continued)

OTHER PUBLICATIONS

Kadibagil, Mahesh, et al., Position Detection and Tracking System, IRACST—International Journal of Computer Science and Information Technology & Security, vol. 4, No. 3, dated Jun. 2014, downloaded from https://www.researchgate.net/publication/284109455_Position_Detection_and_Tracking_System (Year: 2014).*

(Continued)

*Primary Examiner* — Scott D Gartland
(74) *Attorney, Agent, or Firm* — Zilka-Kotab, P.C.

(57) ABSTRACT

A method and system for analyzing real world information of users to derive physical (real world) user attributes used for selecting online content for presentation by client devices correlated with the users, comprising, detecting a presence of one or more users in a physical registration location by analyzing sensory data captured by one or more sensors deployed to monitor the physical registration location, correlating between the user(s) and an identifier of client device(s) associated with the user(s), identifying one or more user attributes of the user(s) by analyzing the sensory data and transmitting the user attribute(s) coupled with the identifier to one or more remote servers adapted to use the user attribute(s) for selecting one or more online content items served to the client device(s) via a network for presentation to the user(s). The sensor(s) is physically and communicatively disconnected from the client device(s).

11 Claims, 4 Drawing Sheets

(56) References Cited

U.S. PATENT DOCUMENTS

| | | | | |
|---|---|---|---|---|
| 2013/0204700 A1* | 8/2013 | Synett | ............ | G06N 5/02 |
| | | | | 705/14.53 |
| 2015/0213512 A1* | 7/2015 | Spievak | ............ | G06Q 30/0275 |
| | | | | 705/14.71 |
| 2015/0339701 A1* | 11/2015 | Mahajan | ............ | G06Q 30/0244 |
| | | | | 705/14.43 |
| 2017/0255696 A1* | 9/2017 | Pulitzer | ............ | G06F 16/9554 |
| 2018/0232511 A1* | 8/2018 | Bakish | ............ | G06F 21/32 |

OTHER PUBLICATIONS

RTB Ad Spend Continues Robust Growth, from eMarketer.com, dated Apr. 4, 2013, downloaded from https://www.emarketer.com/article/RTB-Ad-Spend-Continues-Robust-Growth/1009783 on Feb. 5, 2021 (Year: 2013).*

Zhang, Weinan, et al., Real-Time Bidding Benchmarking with iPinYou Dataset, from GroundAI, dated Jul. 25, 2014, downloaded on Feb. 5, 2021 from https://www.groundai.eom/project/real-time-bidding-benchmarking-with-inpinyou-dataset/3 (Year: 2014).*

Region Monitoring and iBeacon, dated 2016, downloaded from https://developer.apple.com/library/archive/documentation/UserExperience/Conceptual/LocationAwarenessPG/RegionMonitoring/RegionMonitoring.html on Sep. 3, 2021 (Year: 2016).*

* cited by examiner

SYSTEM, METHOD, AND COMPUTER PROGRAM FOR SERVING ONLINE CONTENT TO USERS BASED ON REAL WORLD USER INFORMATION

FIELD AND BACKGROUND OF THE INVENTION

The present invention, in some embodiments thereof, relates to serving client devices with advertisements (ADs), and, more specifically, but not exclusively, to serving client devices with ADs selected according to user attributes derived from real world information.

Online advertisement has long become one of the main advertisement channels and often considered the most effective channel.

In order to effectively target advertisement (ADs) for specific users in real time highly sophisticated and complex platforms have been constructed based on advanced algorithms which are constantly evolving.

A key element in the real time advertisement trade is Real Time Bidding (RTB) in which publishers of online content offer for sale impressions at AD placements embedded in the online content. RTB requests for the impression sale may be transmitted by automated platforms associated with the publishers, for example, a Supply Side Platform (SSP) and/or the like to one or more AD exchanges.

The AD exchanges may conduct AD auctions in real time by distributing the RTB requests to a plurality of automated platforms associated with a plurality of advertisers, for example, a Demand Side Platform (DSP) and/or the like. In response, the AD exchange may receive from the DSPs a plurality of bid offers for the RTB requests and may select winning bid offers. The AD associated with the winning bid offer(s) may then be served at the respective AD placements for which the RTB requests were issued.

SUMMARY OF THE INVENTION

According to a first aspect of the present invention there is provided a computer implemented method of analyzing real world information of users to derive user attributes used for selecting online content for presentation by client devices correlated with the users, comprising using one or more processors. The processor(s) is adapted for:
  Detecting a presence of one or more users in a physical registration location by analyzing sensory data captured by one or more sensors deployed to monitor the physical registration location.
  Correlating between one or more of the user(s) and an identifier of one or more client devices associated with the respective user.
  Identifying one or more user attributes of one or more of the users by analyzing the sensory data.
  Transmitting the user attribute(s) coupled with the identifier to one or more remote servers adapted to use the user attribute(s) for selecting one or more online content items served to one or more of the client device(s) via one or more networks for presentation to one or more of the user(s).
Wherein the sensors are physically and communicatively disconnected from the client device(s).

According to a second aspect of the present invention there is provided an analysis system for analyzing real world information of users to derive user attributes used for selecting online content for presentation by client devices correlated with the users, comprising a storage storing a code and one or more processors coupled to the storage for executing the stored code, the code comprising:
  Code instructions to detect a presence of one or more users in a physical registration location by analyzing sensory data captured by one or more sensors deployed to monitor the physical registration location;
  code instructions to correlate between one or more of the user(s) and an identifier of one or more client devices associated with the respective user;
  code instructions to identify one or more user attributes of one or more of the users by analyzing the sensory data.
  code instructions to transmit the user attribute(s) coupled with the identifier to one or more remote servers adapted to use the user attribute(s) for selecting one or more online content items served to one or more of the client device(s) via one or more networks for presentation to one or more of the user(s);
Wherein the sensors are physically and communicatively disconnected from the client device(s).

Detecting the user(s), identifying their physical (real world) attributes and correlating the user(s) with their client devices used to consume online content may be used for effectively selecting online content, for example, advertisements (ADs) having an increased probability of being converted (e.g. viewed, clicked, followed, lead to a purchase, etc.). The collected data correlated with the identifier of the online content consumption device may therefore be of great value and interest from a plurality of stakeholders, for example, advertisers, content providers, publishers and/or the like.

According to a third aspect of the present invention there is provided a computer implemented method of serving Real Time Bidding (RTB) requests received from client devices with advertisements (AD) selected based on real world user information, comprising using one or more processors of an RTB server. The processor(s) is adapted for:
  Receiving one or more user attributes of one or more users coupled with an identifier of one or more client devices associated with the respective user. The user attribute(s) are identified by analyzing sensory data captured by one or more sensors separated from the client device(s).
  Receiving, via a network, one or more RTB requests from one or more of the client device(s) for an impression in one or more AD placement offered by online content presented by one or more of the client device(s) to associated user(s).
  Forwarding the RTB request(s) to one or more AD exchange together with the user attribute(s) correlated with the client device(s) according to the identifier.
  Receiving from one or more of the AD exchanges a plurality of bid offers received from a plurality of advertisers for purchasing the impression to post a plurality of ADs. The plurality of ADs is selected according to the user attribute(s).
  Initiating service of one or more of the plurality of ADs to one or more of the client devices.

According to a fourth aspect of the present invention there is provided a system for serving Real Time Bidding (RTB) requests received from client devices with advertisements (AD) selected based on real world user information, comprising a storage storing a code and one or more processor of an RTB server coupled to the storage for executing the stored code, the code comprising:
  Code instructions to receive one or more user attributes of one or more users coupled with an identifier of one or more client devices associated with the respective user.

The user attribute(s) are identified by analyzing sensory data captured by one or more sensors separated from the client device(s).

Code instructions to receive, via a network, one or more RTB requests from one or more of the client device(s) for an impression in one or more AD placement offered by online content presented by one or more of the client device(s) to associated user(s).

Code instructions to forward the RTB request(s) to one or more AD exchange together with the user attribute(s) correlated with the client device(s) according to the identifier.

Code instructions to receive from one or more of the AD exchanges a plurality of bid offers received from a plurality of advertisers for purchasing the impression to post a plurality of ADs. The plurality of ADs is selected according to the user attribute(s).

Code instructions to initiate service of one or more of the plurality of ADs to one or more of the client devices.

Selecting the online content items, for example, ADs for service to the user(s) according to the physical (real world) user attributes identified for the user(s) may significantly improve effectivity of the served content since the physical user attributes may significantly enhance characterization of the user(s) with respect to a plurality of physical (real world) aspects of user, for example, an appearance of the user, a company (members) of the user, an activity the user is engaged in, a state of mind of the user and/or the like. Effectively targeting the user(s) may therefore significantly increase the probability that the selected ADs will be converted (e.g. viewed, clicked, followed, lead to a purchase, etc.). The increased conversion rate may significantly increase the income for the advertisers whose ADs are converted since the conversion may be indicative of a purchase, an intended purchase and/or the like. This may also significantly increase the income for publishers selling the impressions for AD placements embedded in their online content presented to the users.

In a further implementation form of the first and/or second aspects, each of the one or more sensors is a member of a group consisting of: an imaging sensor, an audio sensor, a motion sensor and/or a temperature sensor. Supporting deployment of a wide variety of sensors may allow simple integration, adaptation and adaption for a plurality of applications, site characteristics and/or the like since the sensors may be selected according to such site characteristics and/or application needs.

In a further implementation form of the first and/or second aspects, the correlation is based on analysis of a registration dataset associating each of a plurality of users with an identifier of one or more of a plurality of client devices associated with the respective user. Correlation between the user(s) and their associated client device(s) may be easily done at the registration location in which early registration data may be retrieved from the registration dataset(s) to obtain the identifiers of the client devices associated with the users.

In a further implementation form of the first and/or second aspects, the correlation is based on analysis of signals originating from one or more of the client devices at the physical registration location to extract the identifier of the client device(s). Correlating the users with their associated client devices may be completely automated independently of early registration and/or manual data insertion since the identifiers may be automatically obtained and correlated with the users.

In an optional implementation form of the first and/or second aspects, one or more of the users are tracked after leaving the physical registration location for selecting one or more content items to serve to the client device for presentation to one or more of the tracked user(s) based on one or more user attribute identified by analyzing further sensory data received from one or more sensors. Tracking the users after leaving the registration location may allow maintaining the correlation between the users and their associated client devices to serve further online content to the users even while they are no longer at the registration location.

In a further implementation form of the first and/or second aspects, one or more of the users are tracked by tracking one or more visual attributes of the respective user identified based on a visual analysis of the sensory data captured by one or more imaging sensors deployed to monitor the physical registration location. Tracking the users according to their identified visual attributes may be done using currently available tools such as, for example, face recognition systems and tools, visual classification algorithms and/or the like thus significantly reducing development and/or deployment complexity and/or cost of the analysis system. Moreover, many sites may already be covered with imaging sensors deployed to monitor the site. The analysis system may therefore take advantage of the existing (deployed) sensors to facilitate the user attributes detection and correlation with the client devices.

In a further implementation form of the first and/or second aspects, one or more of the users are tracked by tracking one or more audible attributes of the respective user identified based on a signal analysis of the sensory data captured by one or more audio sensors deployed to monitor the physical registration location. Tracking the users according to their identified audible attributes may be done using currently available tools such as, for example, voice recognition systems and tools and/or the like thus significantly reducing development and/or deployment complexity and/or cost of the analysis system. Moreover, some sites may be limited in the visual coverage of imaging sensors, for example, dark places, blocked line of sight areas and/or the like which may make the deployment of the audio sensors more efficient and/or cost effective.

In an optional implementation form of the first and/or second aspects, the correlation is temporarily maintained for limited time duration, the correlation is discarded at the end of the time duration. Discarding the correlation after the limited time duration (e.g. minutes, hours) may serve to avoid breaking privacy protection laws, rules and/or regulations which may apply for some countries, regions and/or sites.

In an optional implementation form of the first and/or second aspects, the user attribute(s) are forwarded to one or more RTB server adapted to forward the user attribute(s) to one or more advertisers for selection of one or more online advertisements (ADs) for service to the client device(s) associated with the respective user(s) for presentation to the respective user(s). One or more of the advertisers select one or more of the online ADs based on the user attribute(s) [providing the user attributes to the RTB server(s) for AD serving]. Allowing the advertisers to select the ADs according to the physical (real world) user attributes identified for the user(s) may significantly improve effectivity of the served ADs and may increase the conversion rate of the served ADs since the physical user attributes may be highly descriptive of the physical aspects relating to the users.

In an optional implementation form of the first and/or second aspects, the analysis system is an edge node located at an edge of one or more of the networks serving one or more of the client devices. Conducting the analysis at the edge node may allow for locally detecting the users and correlating them with their client devices without distributing the correlation information over the network. This may serve to avoid breaking privacy protection laws, rules and/or regulations which may apply for some countries, regions and/or sites to prevent such data distribution. Moreover, utilizing the analysis system at the edge node(s) may allow maintaining a single registration dataset (database) for correlating the users with their client devices. This may serve to avoid breaking rules and/or regulation relating to data sharing among different and separate databases which may often be operated by different operators and parties of interest.

In a further implementation form of the first, second, third and/or fourth aspects, the service of one or more of the content items to the one or more client devices is done according to the identifier of the client device(s). The client device must each be identified by its unique identifier in order to properly stream the online content, for example the ADs to each client device.

In a further implementation form of the first, second, third and/or fourth aspects, each of the user attributes is a member of a group consisting of: a visual attribute, an audible attribute, a temperature attribute, a company of the respective user, an activity the respective user is currently engaged in and/or an estimated state of mind of the respective user. Detecting a wide range and variety of physical user attributes of different modalities (e.g. visual, audible, etc.) may significantly improve characterization of the users.

In an optional implementation form of the first, second, third and/or fourth aspects, one or more of the content items are selected according to one or more user attributes identified for one or more other persons in the company of the respective user. Extending the selection of the online content, for example, the ADs according to the attributes identified for other member of the company of the users may further enhance the effectivity of the selected online content items to the target users and their party.

In an optional implementation form of the first, second, third and/or fourth aspects, the sensory data is analyzed to determine a conversion of one or more of the selected ADs presented by the client device(s) associated with the respective user(s). One or more of the advertisers are charged in case the conversion is verified. Charging the advertisers according to the verification of the conversion, i.e. pay per happening, may significantly improve effectivity of charging the advertisers since the actual conversion may be verified, demonstrated and/or proved. Moreover, the advertisers may use the verification information to improve the ADs selection process by applying analysis and/or learning techniques to analyze the conversion events and identify patterns to determine effectivity of the selected ADs.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS

Figure 1:
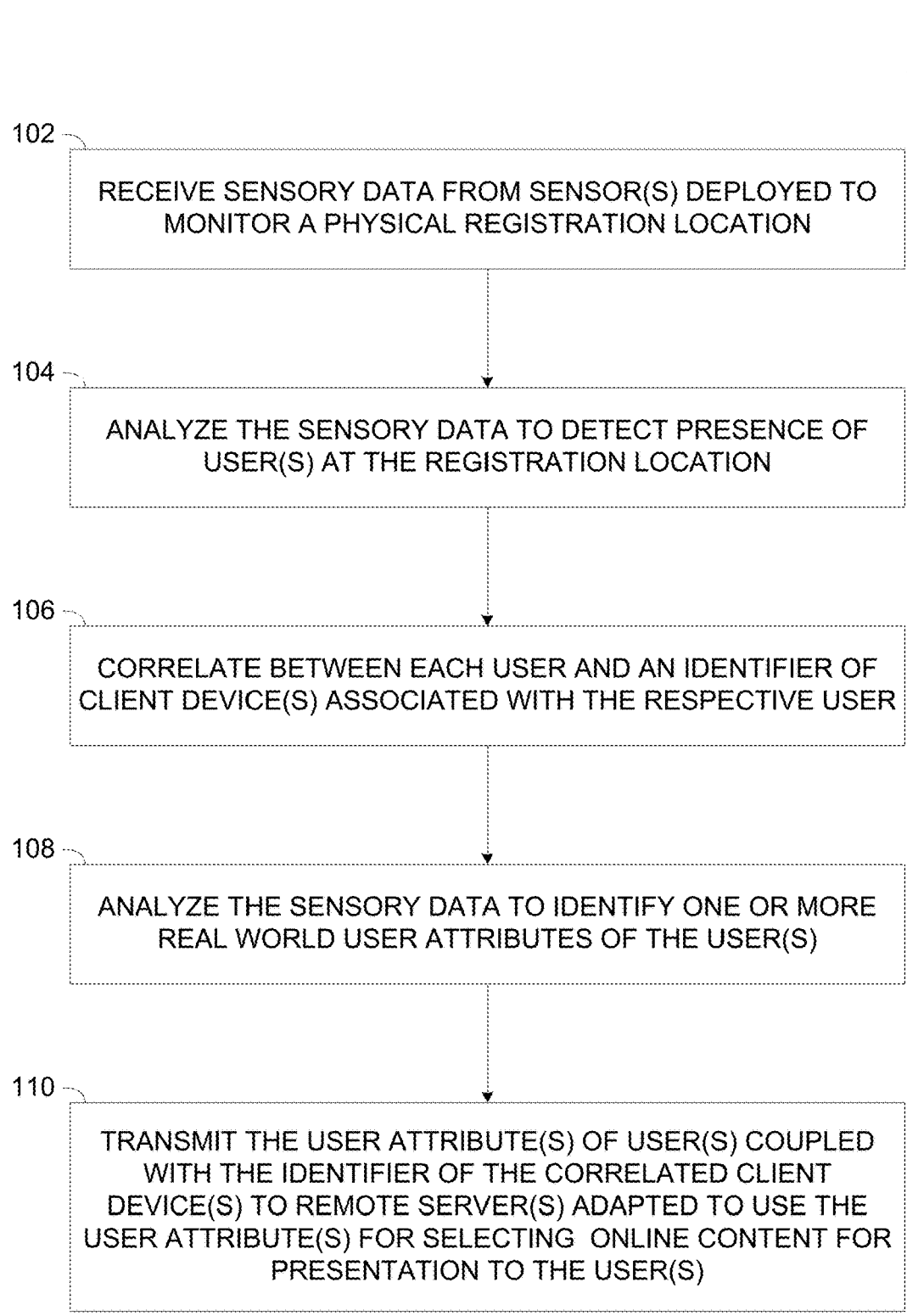
FIG. 1 is a flowchart of an exemplary process of analyzing real world information of users to derive user attributes used for selecting online content for presentation by client devices correlated with the users, according to some embodiments of the present invention.

The present invention, in some embodiments thereof, relates to serving client devices with advertisements (ADs), and, more specifically, but not exclusively, to serving client devices with ADs selected according to user attributes derived from real world information.

According to some embodiments of the present invention, there are provided methods and systems for identifying one or more physical (real world) user attributes of one or more users and correlating the user(s) with one or more client device(s), for example, a Smartphone, a tablet, a smart watch, smart glasses and/or the like used by the user(s) to consume online content. The physical user attribute(s) identified for the user(s) may be used for selecting one or more online content items, for example, an advertisement (AD) and/or the like to be served to the client device(s) for presentation to the user(s).

Correlation of the user(s) with the client device(s) they use, i.e. correlating the user(s) with their associated client device(s) may be done by detecting the user(s) at a physical registration location at which the user(s) may register to enter a certain site (e.g. a park, a theme park, a public building, a theater, a sports stadium, etc.), area (e.g. an office building, a factory, etc.), event (e.g. a sports match, a music concert, a movie, etc.), venue (e.g. a public gathering, a social activity, a demonstration, etc.) and/or the like collectively designated site herein after.

The physical registration location may be a limited space, for example, a post, a booth, a barrier, a railing and/or the like deployed with one or more registration systems which may be used by the user(s) for registering in order to enter the site. The registration system(s) may include one or more automated registration systems, for example, a ticket reader, a client terminal, a Radio Frequency Identification (RFID) reader, a biometric sensor and/or the like at which the user(s) may identify himself and/or present a ticket for entry to the site. Additionally and/or alternatively, one or more human operated registration systems are deployed at the registration location, for example, a client terminal, computer, a Smartphone, a tablet, a mobile terminal and/or the like used by an operator and/or by the user(s) for receiving the identification information of the user(s) and/or the ticket presented by the user(s).

One or more sensors, for example, an imaging sensor, an audio sensor, a motion sensor, a temperature sensor and/or the like may be deployed to monitor the physical registration location for capturing one or more users located at the physical registration location. The sensor(s) may be deployed to monitor the registration location such that a specific user registering at the registration location at a certain time is captured by the sensor(s) and a one-to-one correlation may be done to identify the user captured by the sensor(s) as the user conducting the registration process. It is emphasized that the sensor(s) is separated from the client device(s) of the user(s) and is physically and communicatively disconnected from the client device(s).

Sensory data captured by the sensor(s) may be analyzed to detect presence of a user at the physical registration location. While describe for a single user, the sensory data may naturally be analyzed for detecting a plurality of users at the registration location at different times and/or for detecting a plurality of users registering at a plurality of registration systems.

In addition a unique identifier of client device(s) associated with the detected user may be detected during the registration process. The identifier may include, for example, a Mobile Station International Subscriber Directory Number (MSISDN), an International Mobile Subscriber Identity (IMSI), an Internet Protocol (IP) address and/or the like.

The identifier of the associated client device(s) may be detected by analyzing one or more digital datasets, for example, a list, a table, a database and/or the like mapping (correlating) the user(s) and his associated client device(s). The digital dataset(s) may be updated with the identifier(s) of the associated client device(s) prior to the time when the user(s) arrives at the physical registration location. For example, a certain user may have purchased a ticket for an event in advance. Assuming that during the time of purchase the certain user provided the identifier of his client device(s), the digital dataset(s) may be updated to associate between the certain user and the identifier of his client device(s). In another example, the digital dataset(s) which may be used by one or more services (e.g. an online service, a social network, etc.) to which a certain user registered in the past may have been updated to associate between identification information of user(s), for example, a name, an ID number, a social security number and/or the like and the identifier of client device(s) associated with the user(s).

At the physical registration location, the detected user conducting the registration process may use the automated and/or human operated registration system(s) to identify himself and/or his ticket, for example, present his ticket, type his name, type his ID number, present an RFID device identifying him (e.g. name, ID, etc.), conduct a biometric verification (e.g. fingerprint, iris recognition, voice pattern recognition, etc.) and/or the like. The identification of the detected user and/or the identification of the ticket may be searched in the digital dataset(s) to retrieve the identifier(s) of the client device(s) associated with the detected user.

Optionally, the identifier of the associated client device(s) may be detected by analyzing signals (transmission) originating from the associated client device(s) while the detected user is at the physical registration location. The signals originating from each associated client device may include identification signals broadcasting the identifier of the respective client device, for example, the MSISDN, the IMSI, the IP address and/or the like. The signals may be captured by one or more receivers deployed to capture the identification signals transmitted by the associated client device(s) while the detected user is at the physical registration location to verify the captured identification signals originate from the associated client device(s) 202 while the detected user is located at the registration location. For example, multiple receivers may be deployed to allow triangulation of the captured identification signals to the registration location. In another example, one or more directed receivers may be deployed to capture the identification signals only when transmitted from the registration location.

Once the detected user is correlated with his associated client device(s) the sensory data may be further analyzed to detect one or more physical (real world) attributes of the detected user, for example, a visual attribute, an audible attribute, a temperature attribute, a company of the at least one user, an activity the at least one user is currently engaged in and an estimated state of mind of the at least one user and/or the like.

Optionally, the detected user is tracked after leaving the registration location and entering the site while maintaining the correlation between the detected and now tracked user and his associated client device(s). The site may be deployed with one or more sensors adapted to monitor additional areas of the site. Sensory data captured by one or more sensor(s) deployed to monitor the site, in particular imaging sensor(s) and/or audio sensor(s) may be analyzed in order to track the user in the site. One or more users may be tracked, for example, based on face recognition applied while the user is detected at the registration location and analyzing sensory data captured in the site to identify the face(s) to track the user(s) in the site. In another example, one or more users may be tracked the by identifying a unique outfit of the tracked user(s) and analyzing sensory data captured by the sensor(s) deployed in the site to identify the unique outfit(s) to track the user(s) in the site. Sensory data captured by the sensor(s) deployed to monitor the site may be analyzed in order to track the tracked user and identify one or more additional physical user attributes of the tracked user. While tracked, the sensory data captured by the sensor(s) deployed to monitor the site may be analyzed to identify one or more additional physical user attributes of the tracked user.

The physical user attribute(s) identified for the detected and/or tracked user may be sent coupled with the identifier(s) of his associated client device(s) to one or more remote systems, services, platforms and/or the like adapted to select online content according to the user attribute(s) and serve the online content to the associated client device(s). The remote system(s) may include, for example, one or more systems associated with content provider(s), publisher(s) and/or the like which may select online content for service to the detected and/or tracked user according to the identified physical user attribute(s). In another example, the remote system(s) may include one or more systems associated with aggregator(s) which may collect real world (physical) user information (i.e. the physical user attribute(s)) and offer, sell and/or auction the collected physical user information to one or more other systems, for example, an RTB and/or the like. The online content may be served to the specific client device(s) associated with the detected and/or tracked user according to the unique identifier of the associated client device(s).

In particular the physical user attribute(s) identified for one or more of the detected and/or tracked users may be used for selecting one or more ADs to be served to the associated client device(s) for presentation to the respective detected and/or tracked user(s).

The physical user attribute(s) of the detected and/or tracked user coupled with the identifier(s) of his associated client device(s) may be sent to one or more RTB servers which may conduct one or more RTB processes for serving ADs to the associated client device(s). Optionally, the physical user attribute(s) coupled with the client device(s) identifier(s) are sent to one or more of the aggregators who may forward the physical user attribute(s) coupled with the client device(s) identifier(s) to the RTB server(s). The RTB server(s) may receive from the associated client device(s) one or more RTB requests for impressions at one or more AD placements embedded in the online content presented by the associated client device(s) to the detected and/or tracked user(s). The RTB server(s) may further correlate between the identifier(s) of the associated client device(s) received with the physical user attribute(s) and the identifier(s) of the associated client device(s) embedded in the RTB request(s) to correlate the physical user attribute(s) with respective RTB request(s). The RTB server(s) may forward the RTB request(s) including the correlated physical user attribute(s) to one or more AD exchanges and may receive in response a plurality of bid offers for ADs selected by one or more advertisers according to the physical user attribute(s) of the respective detected and/or tracked user(s). One or more of the ADs associated with winning bid offers may be served to the associated client device(s) for presentation to the respective detected and/or tracked user(s).

According to some embodiments of the present invention there are provided methods and systems for verifying an actual conversion of one or more of the ADs presented to the detected and/or tracked user(s) in order to apply a pay per happening charging paradigm for charging the advertiser(s) based on the conversion verification. The pay per happening paradigm defines that the advertiser(s) are charged for the impression(s) in case their AD(s) presented to the user(s) are converted, for example, the user purchases an advertised product and/or service, adds the advertised product and/or service to basket, clicks on a link embedded in the AD, follows the product(s) and/or offered by the presented AD(s) and/or the like.

The verification of the conversion, for example, a purchase of an item and/or a service offered by one or more ADs presented to one or more of the detected and/or tracked user(s) may be done by analyzing the sensory data captured by one or more of the sensors deployed to monitor the site.

Serving cached ADs from according to the physical user attributes may present significant advantages and benefits compared to current systems and methods for serving ADs. While some existing ADs serving systems may identify one or more user attributes of the users by analyzing data available from their associated client device(s), such existing systems may have no and/or limited access to the physical attributes of the users.

The physical (real world) user attributes may significantly improve characterization of the user with respect to a plurality of physical (real world) aspects of the users, for example, an appearance of the user, a company (members) of the user, an activity the user is engaged in, a state of mind of the user and/or the like.

Detecting the user(s), identifying their physical (real world) attributes and correlating the user(s) with their client device(s) which are used to consume the online content may be therefore be used for effectively selecting online content, for example, advertisements (ADs) having an increased probability of being converted (e.g. viewed, clicked, followed, lead to a purchase, etc.). The collected data correlated with the identifier of the online content consumption device may therefore be of great value and interest from a plurality of stakeholders, for example, advertisers, content providers, publishers and/or the like.

Selecting the ADs estimated to most effectively target the user(s) based on the identified physical user attributes may therefore significantly increase the probability that the selected ADs will be converted (e.g. viewed, clicked, followed, lead to a purchase, etc.). The increased conversion rate may significantly increase the income for the advertisers whose ADs are converted since the conversion may be indicative of a purchase, an intended purchase and/or the like. This may also significantly increase the income for publishers selling the impressions for AD placements embedded in their online content presented to the users.

Moreover, charging the advertisers according to the verification of the conversion may significantly improve effectivity of charging advertisers. Moreover, the verification may serve the advertisers to improve the selection process since learning techniques may be applied to analyze the conversion events to identify patterns and determine effectivity of the selected ADs.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of analyzing real world information of users to derive user attributes used for selecting online content for presentation by client devices correlated with the users, according to some embodiments of the present invention. An exemplary process 100 may be executed for analyzing sensory data captured by sensors deployed to monitor a physical registration location at which one or more users may register to enter a certain site, area, event, venue and/or the like. The sensory data may be analyzed to detect a presence of the user(s) and to correlate between the users(s) and their associated client device(s), in particular to correlate between the user(s) and an identifier(s) of their associated client device(s).

Real world (physical) information derived from the sensory data may be further analyzed to identify one or more users attributed of the user(s). The user attribute(s) of one or more users coupled with the identifier(s) of their associated client device(s) may be transmitted to one or more remote servers adapted to select online content according to the user attribute(s). The online content may be presented by the correlated client device(s) identified by the identifier(s).

Figure 2:
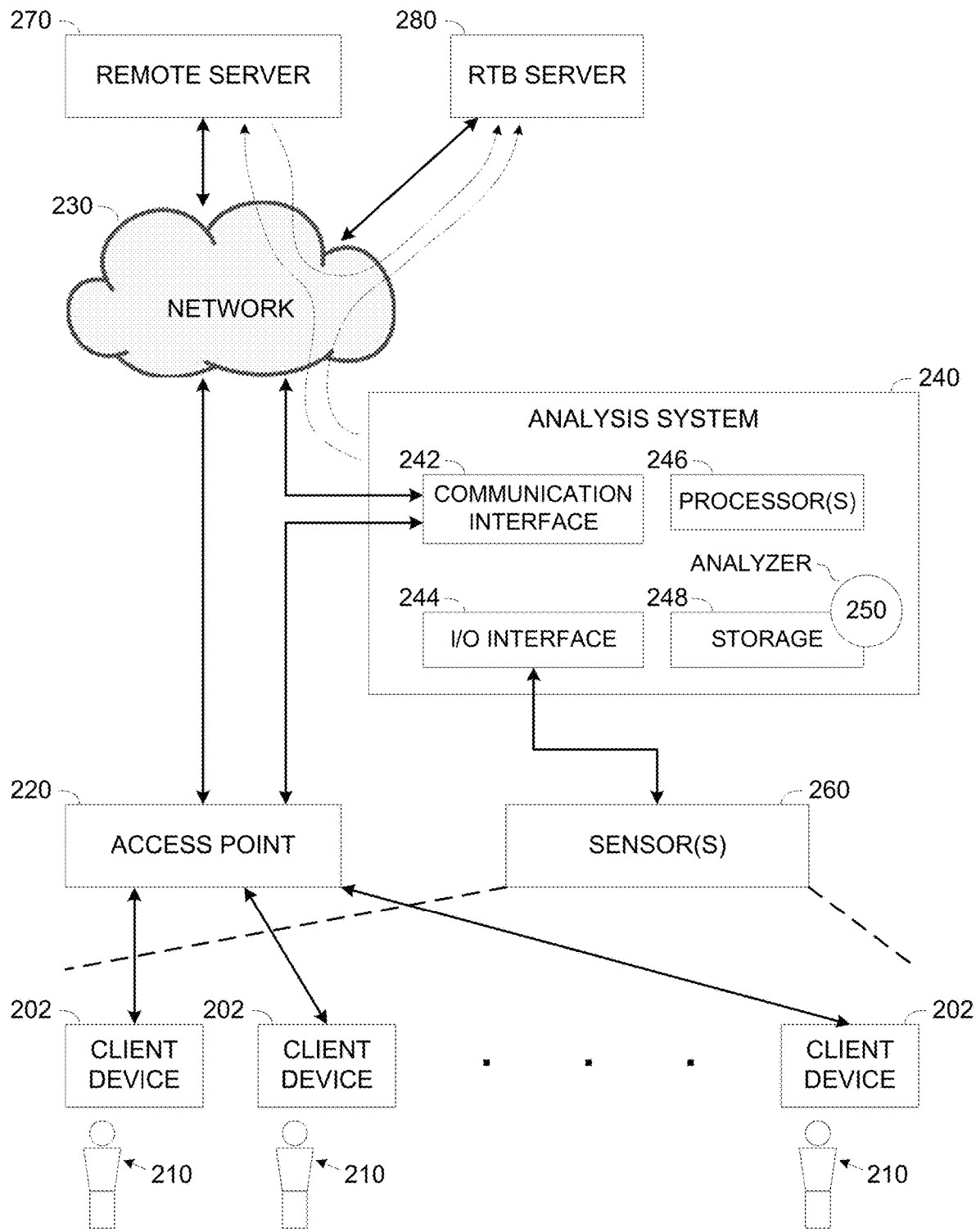
FIG. 2 is a schematic illustration of an exemplary system for analyzing real world information of users to derive user attributes used for selecting online content for presentation by client devices correlated with the users, according to some embodiments of the present invention.

Reference is also made to FIG. 2, which is a schematic illustration of an exemplary system for analyzing real world information of users to derive user attributes used for selecting online content for presentation by client devices correlated with the users, according to some embodiments of the present invention.

One or more client devices 202, for example, a Smartphone, a tablet, a smart watch, smart glasses and/or the like associated with respective users 210 may connect to a network 230, for example, a Local area Network (LAN), a Wireless LAN (WLAN), a Wide Area Network (WAN), a Municipal Area Network (MAN), a cellular network, the internet and/or the like. The client devices 202 may typically connect to the network 230 through one or more access points 220, for example, a router, a cellular base station and/or the like providing network connectivity, specifically wireless connectivity (e.g. WLAN, cellular link, etc.) to the client device(s) 202.

One or more of the client devices 202 having network connectivity may execute one or more an online content consumption applications, for example, a web browser, a mobile application and/or the like presenting online content to the respective user(s) 210. The online content may be provided by one or more content publishers from one or more remote servers 270, for example, a server, a computing node, a cluster of computing nodes, a cloud resource, a cloud service and/or the like.

The online content may embed one or more AD placements for posting visual ADs (e.g. images, video clips, drawings, symbols, etc.), audible ADs (e.g. audio playbacks, etc.) and/or a combination thereof. For example, one or more of the client devices 202 may execute a web browser executing a webpage embedding one or more AD placements. In another example, one or more of the client devices 202 may execute a mobile application embedding one or more AD placements. The AD placements may include AD spaces for posting visual ADs (e.g. images, video clips, drawings, symbols, etc.), audible ADs (e.g. audio playbacks, etc.) and/or a combination thereof.

One or more of the client devices 202 may issue one or more Real Time bidding (RTB) requests offering for sale impressions at one or more of the AD placements. The RTB requests may be received by one or more RTB servers 280, for example, a server, a processing node, a cluster of processing nodes, a cloud service and/or the like.

An analysis system 240, for example, a server, a computing node, a cluster of computing nodes and/or the like may connect to one or more sensors 260, for example, an imaging sensor, an audio sensor, a motion sensor, a temperature sensor and/or the like deployed to monitor the physical registration location for capturing one or more users 210 located at the physical registration location.

The physical registration location may be a limited space, for example, a post, a booth, a barrier, a railing and/or the like deployed with one or more registration systems which may be used by one or more of the users 210 for registering in order to enter a site (e.g. a park, a theme park, a public building, a theater, a sports stadium, etc.), an area (e.g. an office building, a factory, etc.), an event (e.g. a sports match, a music concert, a movie, etc.), a venue (e.g. a public gathering, a social activity, a demonstration, etc.) and/or the like collectively designated site hereinafter. The registration system(s) may include one or more automated registration systems deployed in the registration location, for example, a ticket reader, a client terminal, an RFID reader, a biometric sensor and/or the like at which the user(s) 210 may identify themselves and/or present a ticket for entry to the site. Additionally and/or alternatively, one or more human operated registration systems are deployed at the registration location, for example, a client terminal, computer, a Smartphone, a tablet, a mobile terminal and/or the like used by an operator and/or by the user(s) 210 for receiving identification information of the user(s) 210 and/or the ticket presented by the user(s) 210.

The sensor(s) 260 may be deployed to monitor the registration location such that the specific user 210 registering at the registration location at a certain time is captured by the sensor(s) 260 and a one-to-one correlation may be done to identify the user 210 captured by the sensor(s) 260 as the user 210 conducting the registration. It is emphasized that the sensor(s) 260 is separated from the client device(s) 202 and are physically and communicatively disconnected from the client device(s) 202.

The imaging sensor(s) 260 may include, for example, one or more cameras, one or more video cameras, one or more infrared cameras, one or more night vision cameras, one or more thermal cameras and/or the like. The audio sensor(s) may include, for example, one or more microphones, one or more directed microphones and/or the like. The motion sensor(s) may include, for example, one or more Passive Infrared (PIR) sensors, one or more microwave sensors, one or more ultrasonic sensors and/or the like. The temperature sensor(s) may include, for example, one or more pyrometers, one or more remote infrared thermometers and/or the like.

The analysis system 240 may include a communication interface 242 for connecting to the network 230, an Input/Output (I/O) interface 244 for connecting to the sensor(s) 260, a processor(s) 246 for executing a process such as the process 100 and a storage 258.

The communication interface 242 may include one or more wired and/or wireless network interfaces for connecting to the network 240 to communicate with one or more remote networked resources, for example, the remote server 270, the RTB server 280 and/or the like. The I/O interface 244 may include one or more wired and/or wireless interfaces, for example, a LAN interface, a Universal Serial Bus (USB) interface, a serial interface, a Radio Frequency (RF) interface, a Bluetooth interface, a Wireless LAN (WLAN) interface (e.g. Wi-Fi) and/or the like. Using the I/O interface 244, the analysis system 240 may connect and communicate with the sensor(s) 260.

The processor(s) 246, homogenous or heterogeneous, may include one or more processing nodes arranged for parallel processing, as clusters and/or as one or more multi core processor(s). The storage 248 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 248 may further comprise one or more network storage resources, for example, a storage server, a network accessible storage (NAS), a network drive, a cloud storage and/or the like accessible via the network interface 242.

The processor(s) 246 may execute one or more software modules, for example, a process, a script, an application, an agent, a utility, a tool and/or the like each comprising a plurality of program instructions stored in a non-transitory medium (program store) such as the storage 248 and executed by one or more processors such as the processor(s) 246. For example, the processor(s) 246 may execute an analyzer application 250 to analyze sensory data captured by the sensor(s) 260, correlate between user(s) 210 detected in the registration location and their associated client device(s) 202, further analyze the sensory data to identify one or more user attributes of the detected user(s) 210 and transmit the user attributes to a remote networked resources, for example, the remote server 270, the RTB server 280 and/or the like.

Optionally, the analysis system 240 and/or the analyzer 250 executed by the analysis system 240 are implemented as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

According to some embodiments of the present invention the analysis system 240 is an edge node, for example, a server, a network node, a processing node comprising one or more processors, a cluster of processing nodes and/or the like is located in close network proximity to the client devices 202. As such the analysis system 240 may be located at the edge of the network 230 serving the client devices 202, for example, in close network proximity to the access point(s) 220. Moreover, the analysis system 240 may connect to the network 230 through the access point 220.

As shown at 102, the process 100 starts with the analyzer 250 receiving sensory data captured by one or more of the sensors 260 deployed to monitor the physical registration location.

The sensory data may naturally depend on the type and/or technology of the respective sensor(s) 260 which captured the sensory data. For example, the sensory data may include one or more images captured by one or more imaging type sensors 260 where the image(s) depict the registration location. In another example, the sensory data may include sound captured by one or more audio type sensors 260 where the sound may originate from a user 210 and/or an object located at the registration location. In another example, the sensory data may include motion data captured by one or more motion type sensors 260 where the motion may be triggered by a user 210 located at the registration location. In another example, the sensory data may include temperature data captured by one or more temperature type sensors 260 where the temperature may be induced by a user 210 and/or an object located at the registration location.

At any given time a single user 210 may be detected at each registration system located at the physical registration location. While the process 100 described herein relates to a single user 210 detected at the registration location this should not be construed as limiting as the process 100 may be expanded temporally for a plurality of users 210 registering at the registration location in sequence. The process 100 may also be expanded spatially for a plurality of users 210 simultaneously registering at the registration location where each user 210 uses a respective one of a plurality of registration systems deployed in the registration location.

As shown at 104, the analyzer 250 analyzes the received sensory data to detect presence of a user 210 at the registration location. The analyzer 250 may apply one or more analyses according to the sensory data received from the sensor(s) 260.

For example, assuming the sensory data includes the image(s) captured by the imaging type sensor(s) 260, the analyzer 250 may apply one or more image processing analyses for analyzing the captured image(s) to detect presence of the user 210 currently located at the registration location. The analyzer 250 may further analyze the image(s) to verify that the user 210 is in the process of registering at the registration location. The analyzer 250 may optionally apply one or more machine learning classifiers to the captured image(s) to identify the user 210 at the registration location. The machine learning classifier(s) are trained to visually identify users 210 and/or the surroundings of the registration location as known in the art.

In another example, assuming the sensory data includes the sound captured by the audio type sensor(s) 260, the analyzer 250 may apply one or more signal processing analyses for analyzing the captured sound to detect sound and/or speech of the user 210 currently located at the registration location and conducting the registration process. As described herein above, the audio type sensor(s) 260, for example, the directed microphone and/or the like are deployed to capture the sound exactly and/or exclusively at the registration location. The analyzer 250 may optionally apply one or more machine learning classifiers to the captured sound to identify the user 210 at the registration location. The machine learning classifier(s) are trained to identify sound and/or speech typical to users 210 (humans) as known in the art.

In another example, assuming the sensory data includes the motion data captured by the motion type sensor(s) 260, the analyzer 250 may associate the motion at the registration location with the user 210 currently located at the registration location and conducting the registration process. As described herein above, the motion type sensor(s) 260 are deployed to capture the motion exactly and/or exclusively at the registration location.

In another example, assuming the sensory data includes the temperature data captured by the temperature type sensor(s) 260, the analyzer 250 may analyze the captured temperature data to identify the user 210 according to the body heat of the user 210 currently located at the registration location and conducting the registration process. As described herein above, the temperature type sensor(s) 260, for example, the pyrometer, the remote infrared thermometer and/or the like are deployed to capture the temperature of the user 210 located exactly and/or exclusively at the registration location.

The analyzer 250 may further correlate between sensory data captured by different sensors 260 to detect and/or verify the presence of the user 210 at the registration location. For example, the analyzer 250 may analyze the image(s) captured by several imaging type sensors 260 monitoring the registration location to detect and/or verify the presence of the user 210 at the registration location. In another example, the analyzer 250 may analyze the image(s) captured by the imaging type sensor(s) 260 in conjunction with motion data captured by one or more motion type sensor(s) 260 monitoring the registration location to detect and/or verify the presence of the user 210 at the registration location.

As shown at 106, the analyzer 250 correlates between the user 210 detected at the registration location and one or more client devices 202 associated with the detected user 210 and typically, carried, held, worn, attached and/or the like by the detected user 210. In particular, the analyzer 250 correlates between the detected user 210 and an identifier of the associated client device(s) 202, for example, the MSISDN, the IMSI, the IP address and/or the like.

At the physical registration location, the detected user 210 may typically conduct a registration process in which the user 210 identifies himself in order to enter the site, the event, the venue and/or the like. For example, using the automated registration system(s) the detected user 210 may identify himself by presenting his ticket for the event. In another example, using the automated registration system(s) the detected user 210 may type his name, type his ID number, present an RFID device identifying him (e.g. name, ID, etc.) and/or the like. In another example, using the automated registration system(s) the detected user 210 may, type his name, type his ID number and/or the like. In another example, using the automated registration system(s) the detected user 210 may conduct a biometric verification (e.g. fingerprint, iris recognition, voice pattern recognition, etc.) which may be compared against one or more digital datasets, for example, a file, a table, a database and/or the like in which the detected user 210 may be registered to verify his identity, The analyzer 250 may correlate between the detected user 210 and his associated client device 202 using one or more correlation techniques.

For example, the analyzer 250 may correlate between the detected user 210 and his associated client device(s) 202 according to an early registration process conducted by the detected user 210 in advance, i.e. prior to arriving at the physical registration location. For example, assuming the detected user 210 has registered for the event in advance, for example, purchased a ticket for the event, filled in an application form for participating in the venue and/or the like. In such case the detected user 210 may have provided an identifier of his client device(s) 202 during the early registration.

In another example, one or more of the user 210 may have registered in the past for one or more services, applications and/or the like and has provided in addition to his identification information (e.g. name, ID number, biometrics, etc.) the identifier of his client device(s) 202 during the registration process. The client device 202 identifier may therefore be associated with, for example, an ID (e.g. number) of the ticket purchased by the detected user 210, the name of the detected user 210, an ID of the detected user 210 and/or the like. The association between registered users 210 and their associated client devices 202 may be stored in one or more digital datasets, for example, a list, a table, a database and/or the like. The analyzer 250 may analyze the online dataset(s) and search the identification of the detected user and/or of the ticket previously provided by the detected user 210 during the in advance registration. The analyzer 250 may extract the identifier of the client device(s) 202 associated with the detected user 210 and correlate between the detected user 210 and his associated client device(s) 202.

Optionally, the digital dataset(s) holding the identification information of the users 210 and the information of their associated client device(s) 202 is locally stored in the analysis system 240, for example, in the storage 248. Locally storing the digital dataset(s) may be beneficial to overcome privacy laws and/or regulations which may apply in one or more regions, countries, states and/or the like where the analysis system 240 may be deployed.

In another example, the analyzer 250 may correlate between the detected user 210 and his associated client device(s) 202 according to signals (transmission) originating from the associated client device(s) 202 while the detected at the physical registration location. The analyzer 250 may analyze the signals originating from the associated client device(s) 202 to detect the identifier of the associated client device(s) 202, for example, the MSISDN, the IMSI, the IP address and/or the like. For example, the associated client device(s) 202 may broadcast one or more identification signals indicating the identifier of the respective associated client device 202. The associated client device(s) 202 may broadcast the identification signal(s) continuously, periodically and/or in response to a request.

The identification signal(s) may be broadcasted via one or more wireless communication channels, networks and/or links, for example, a WLAN, a cellular network, a Bluetooth link and/or the like. One or more receivers adapted to capture the identification signals may be deployed to capture the identification signals transmitted by the associated client device(s) 202 while the detected user 210 is at the registration location. Moreover, the receiver(s) may be deployed to allow association of the captured identification signals with the client device(s) 202 associated with the detected user 210, i.e. the client device(s) 202 currently located at the registration location. For example, multiple receivers may be deployed to allow triangulation of the captured identification signals to the registration location. In another example, one or more directed receivers may be deployed to capture the identification signals only when transmitted from the registration location. The analyzer 250 may analyze the identification signals captured by the receivers and extract the identifier of the client device(s) 202 associated with the detected user 210.

As shown at 108, the analyzer 250 may further analyze the sensory data to identify one or more user attributes of the detected user 210, in particular, physical (real world) user attributes, for example, a visual attribute, an audible attribute, a temperature attribute, a company of the at least one user, an activity the at least one user is currently engaged in and an estimated state of mind of the at least one user and/or the like.

For example, assuming the sensory data includes the image(s) captured by the imaging type sensor(s) 260, the analyzer 250 may apply the captured image processing analysis(s) and optionally the machine learning classifier(s) to the image(s) to identify one or more visual attributes of the user 210 detected at the physical registration location. For example, the visual attributes may include one or more physical attributes of the detected user 210, for example, a height, a hair color and/or hairdo and/or the like. In another example, the visual attributes may include the face of the detected user 210. In another example, the visual attributes may include one or more cloth items (e.g. shirt, dress, pants, hat, shoes, etc.) of the detected user 210. The analyzer 250 may further analyze the captured image(s) to estimate a state of mind of the detected user 210 based on the facial expression identified for the detected user 210.

In another example, assuming the sensory data includes the sound captured by the audio type sensor(s) 260, the analyzer 250 may apply the signal processing analysis(s) and optionally the machine learning classifier(s) to the captured sound to identify one or more audible attributes of the user 210 detected at the physical registration location. For example, the audible attributes may include one or more voice attributes the detected user 210, for example, a tone, a volume level, a frequency spectrum, a voice signature and/or the like. In another example, the audible attributes may include speech content, for example, word(s), phrase(s) and/or the like. In another example, the audible attributes may include a company of the user 210, for example, one or more companion persons (e.g. a wife, a child, a friend, etc.), a pet and/or the like.

The analyzer 250 may further analyze the captured sound to estimate a state of mind of the detected user 210 based on the voice attribute(s) identified for the detected user 210.

In another example, assuming the sensory data includes the temperature data captured by the temperature type sensor(s) 260, the analyzer 250 may analyze the temperature data to identify one or more temperature attributes of the user 210, for example, a body heat, a face surface heat and/or the like.

In another example, the user attributes identified by the analyzer 250 may include one or more activities the detected user 210 is engaged in, for example, reading a book, using a mobile application executed by the associated client device 202, singing a song and/or the like.

In another example, the user attributes may include a company of the user 210, for example, one or more companion members such as, for example, a wife, a child, a friend, a colleague, a pet and/or the like. The analyzer 250 may analyze the sensory data captured by the sensor(s) 260, for example, the image(s), the sound and/or the like to identify the company member(s). Moreover, the analyzer 250 may analyze the sensory data, for example, the image(s) and/or the sound captured by the sensor(s) 260 to identify one or more visual and/or audible attributes of one or more of the company member.

The analyzer 250 may further correlate between sensory data captured by multiple sensors 260 to identify the user attributes of the user 210. For example, the analyzer 250 may analyze the image(s) captured by a plurality of imaging type sensor(s) 260 monitoring the registration location to identify the user attribute(s) of the detected user 210 and/or of the company member(s) (if exist). In another example, the analyzer 250 may analyze the image(s) captured by one or more imaging type sensors 260 monitoring the registration location in conjunction with sound captured by one or more audio type sensors 260 monitoring the registration location to identify the user attribute(s) of the detected user 210 and/or of the company member(s) (if exist).

As shown at 110, the analyzer 250 may transmit the user attribute(s) identified for the detected user 210 coupled with the identifier of the associated client device(s) 202 to one or more remote more remote networked resources, for example, the remote server 270, the RTB server 280 and/or the like.

For example, the remote server 270 which may be used, operated and/or associated with one or more content providers may use the physical user attribute(s) of the detected user 210 to select one or more online content items for service to the associated client device(s) 202 for presentation to the detected user 210. The remote server 270 may use the identifier of the associated client device(s) 202 to route and serve the selected online content item(s) to the client device(s) 202 associated with the detected user 210. Moreover, the remote server 270 may select one or more of the online content items for service to the associated client device(s) 202 according to the physical user attribute(s) of one or more of the company members of the detected user 210.

In another example, the remote server 270 may be used, operated and/or associated with one or more aggregators who may collect real world (physical) user information (i.e. the physical user attribute(s)) and offer, sell and/or auction the collected physical user information to one or more other systems, for example, the RTB 280 and/or the like. The aggregator remote server(s) 270 may thus transmit the physical user attribute(s) correlated with the identifier(s) of the client device(s) 202 to the RTB server(s) 280.

The RTB server 280 receiving the user attribute(s) of the detected user 210 coupled with the identifier of the client device(s) 202 associated with the detected user 210 may also receive one or more RTB requests from the associated client device(s) 202. The RTB server 280 may compare the identifier received from the analyzer 250 with the identifier included in the RTB request(s) to identify that the identifiers match and hence correspond to the same client device(s) 202. The RTB server 280 may initiate an RTB for selecting one or more ADs in response to the RTB request(s) where the ADs may be selected based on the user attribute(s) received from the analyzer 250. The RTB server 280 may further control serving of the selected AD(s) to the client device(s) 202 associated with the detected user 210 for presentation to the detected user 210.

Optionally, the detected user 210 is tracked after leaving the registration location and the correlation between the detected and now tracked user 210 and his associated client device(s) 202 is maintained. Assuming that after leaving the registration location the detected user 210 enters the site, the event, the venue and/or the like collectively called site herein after. The site may be deployed with one or more sensors such as the sensors 260 adapted to monitor additional areas of the site, in particular, imaging sensor(s) and/or audio sensor(s). The analyzer 250 may analyze further sensory data captured by the sensor(s) deployed to monitor the site in order to track the detected user 210 in the monitored site after leaving the registration location.

For example, assuming the analyzer 250 identified the face of the tracked user 210 when the tracked user 210 was at the registration location, i.e. while the tracked user 210 was the detected user 210. In such case the analyzer 250 may analyze one or more images captured by one or more imaging sensor(s) deployed to monitor the site to detect the face of the tracked user 210 and track him accordingly. In another example, assuming the analyzer 250 identified a unique outfit of the tracked user 210, for example, a combination of a certain shirt, certain pants, certain glasses and a certain hat when the tracked user 210 was at the registration location, i.e. while the tracked user 210 was the detected user 210. In such case, the analyzer 250 may analyze one or more images captured by one or more of the imaging sensor(s) deployed to monitor the site to detect the unique outfit of the tracked user 210 and track him accordingly. In another example, assuming the analyzer 250 identified a voice pattern of the tracked user 210 when the detected user 210 was at the registration location, i.e. while the tracked user 210 was the detected user 210. In such case, the analyzer 250 may analyze sound captured by one or more audio sensor(s) deployed to monitor the site to detect the voice pattern of the tracked user 210 and track him accordingly.

While tracking the tracked user 210 in the site (after leaving the registration location), the analyzer 250 may analyze the further sensory data captured by the deployed to monitor the site to identify one or more additional user attributes of the user 210, for example, a visual attribute, an audible attribute, an activity, a company, a state of mind. Moreover the analyzer 250 may analyze the further sensory data to identify one or more user attributes of one or more members of the company of the tracked user 210 (if exists). For example, based on analysis of the further sensory data, the analyzer 250 may identify the tracked user 210 is engaged in one or more activities, for example, riding a bike, playing soccer, having a picnic and/or the like. In another example, based on analysis of the further sensory data, the analyzer 250 may identify one or more words and/or sentences spoken by the tracked user 210.

The analyzer 250 may transmit the additional user attribute(s) identified for the tracked user 210 coupled with the identifier of the associated client device(s) 202 to the remote server 270. The remote server 270 may use the additional user attribute(s) of the tracked user 210 to select one or more online content items for service to the associated client device(s) 202 for presentation to the tracked user 210. As described before, the remote server 270 may use the identifier of the associated client device(s) 202 to correctly identify and serve the selected online content item(s) to the client device(s) 202 associated with the tracked user 210. Similarly, the analyzer 250 may transmit the additional user attribute(s) identified for the tracked user 210 coupled with the identifier of the associated client device(s) 202 to the RTB server 280. The RTB server 280 may initiate one or more RTB sessions for selecting AD(s) according to the additional user attribute(s) and control service of the selected AD(s) to the associated client device(s) 202 for presentation to the tracked user 210.

The correlation between the detected user 210 and/or the tracked user 210 and the associated client device(s) 220 may be temporarily maintained for a predefined period of time. After expiration of the predefined period of time the correlation (between the user 210 and the associated client device(s) 220) is discarded, i.e. correlation information is no longer available to the analyzer 250, the remote server(s) 270, the RTB server 280 and/or the like. For example, the correlation information may be discarded once the detected user 210 leaves the registration location. In another example, the correlation information may be discarded once the tracked user 210 leaves the site.

Maintaining the correlation information and/or the predefined period of time for maintaining the correlation information may depend on privacy laws and/or regulations applicable for the region in which the analysis system 240 is deployed.

According to some embodiments of the present invention, the RTB server 280 may receive one or more RTB requests from the associated client device(s) 202. In response to the RTB request(s), the RTB server 280 may control service of one or more online ADs selected according to the physical user attribute(s) of the detected user 210 and/or tracked user 210 to the associated client device(s) 202.

Figure 3:
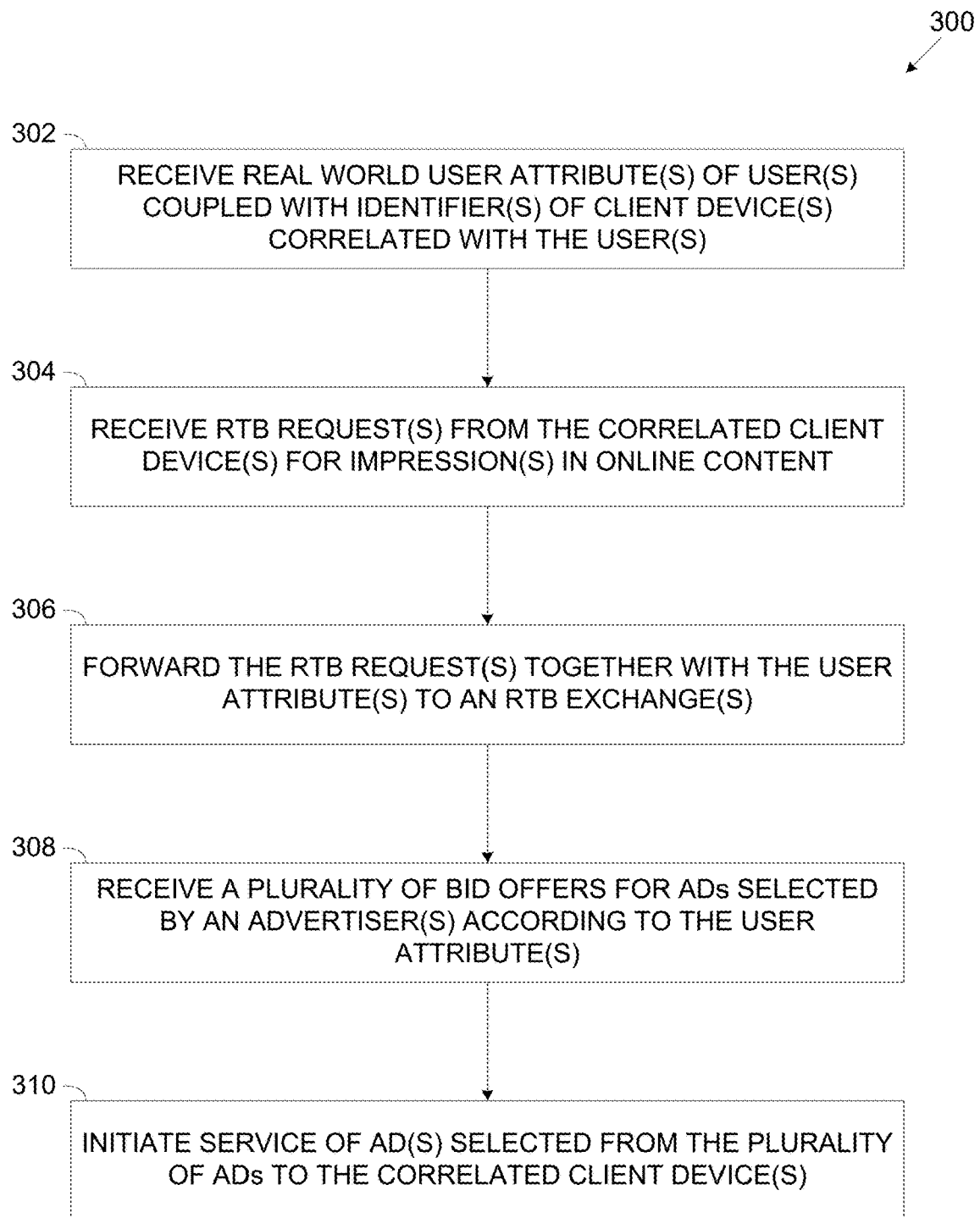
FIG. 3 is a flowchart of an exemplary process of serving, in response to RTB requests from client devices correlated with users, ADs selected according to user attribute(s) derived from real world sensory data captured by sensors deployed to monitor the users, according to some embodiments of the present invention.

Reference is now made to FIG. 3, which is a flowchart of an exemplary process of serving, in response to RTB requests from client devices correlated with users, ADs selected according to user attribute(s) derived from real world sensory data captured by sensors deployed to monitor the users, according to some embodiments of the present invention. An exemplary process 300 may be executed by an RTB server such as the RTB server 280 for controlling service of one or more ADs to one or more client devices such as the client devices 202 according to user attribute(s) identified by an analysis system such as the analysis system 240 for users such as the users 210 correlated with respective client devices 202.

Figure 4:
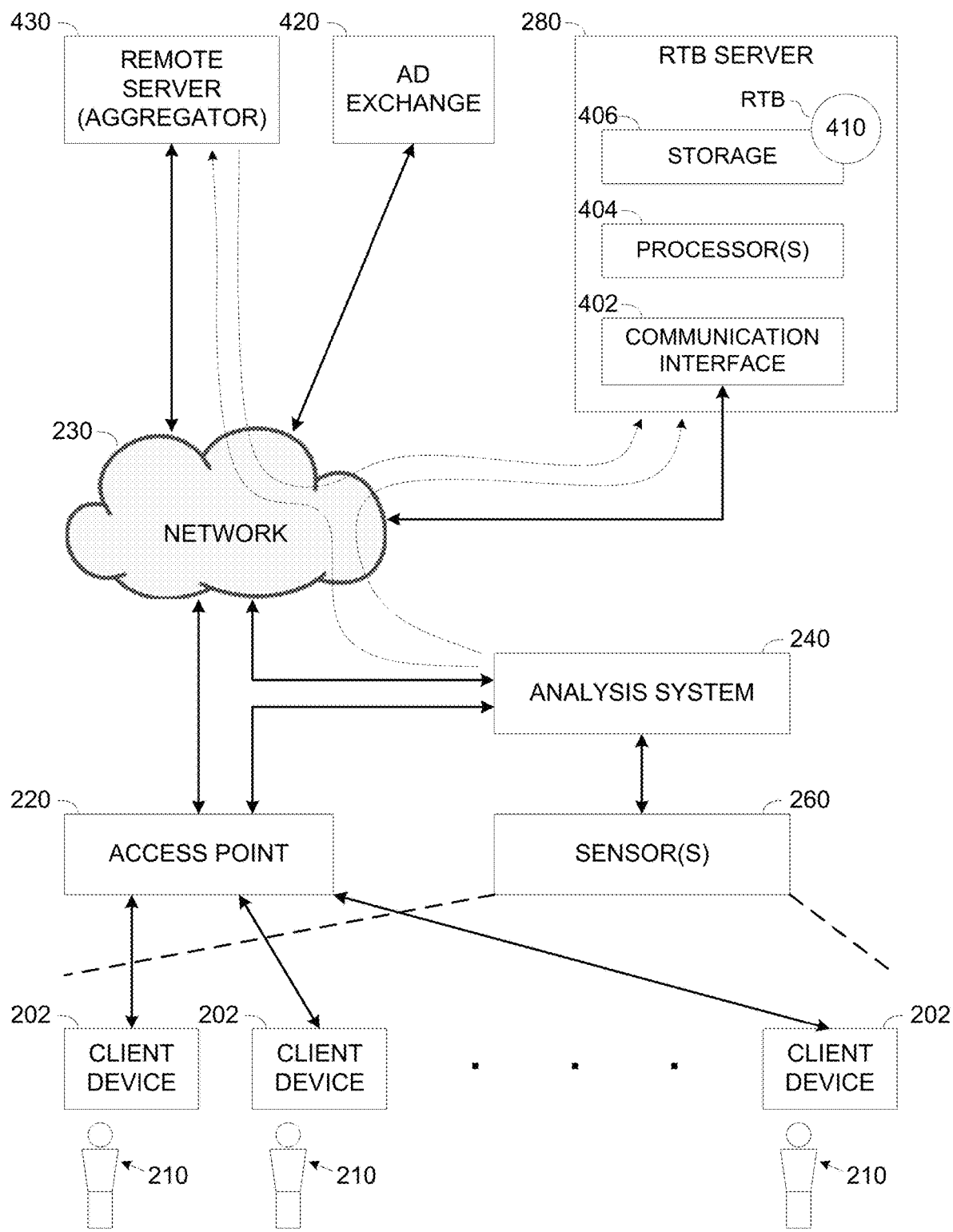
FIG. 4 is a schematic illustration of an exemplary system for serving, in response to RTB requests from client devices correlated with users, ADs selected according to user attribute(s) derived from real world sensory data captured by sensors deployed to monitor the users, according to some embodiments of the present invention.

Reference is also made to FIG. 4, which is a schematic illustration of an exemplary system for serving, in response to RTB requests from client devices correlated with users, ADs selected according to user attribute(s) derived from real world sensory data captured by sensors deployed to monitor the users, according to some embodiments of the present invention. The RTB server, for example, a server, a processing node, a cluster of processing nodes, a cloud service and/or the like may include a communication interface 402, a processor(s) 404 for executing a process such as the process 300 and a storage 406 for storing program code and/or data. The communication interface 402 may include one or more wired and/or wireless network interfaces for connecting to the network 230. The processor(s) 404, homogenous or heterogeneous, may include one or more processing nodes arranged for parallel processing, as clusters and/or as one or more multi core processor(s). The storage 256 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 256 may further comprise one or more network storage resources, for example, a storage server, a NAS, a network drive, a cloud storage and/or the like accessible via the network 240.

One or more remote servers 430, for example, a server, a processing node, a cluster of processing nodes, a cloud service and/or the like may be used, operated, associated and/or the like with one or more data aggregators adapted to collect real world (physical) user information and offer, sell and/or auction the collected physical user information to one or more other systems, for example, the RTB 280 and/or the like.

The processor(s) 404 may execute one or more software modules, for example, a process, a script, an application, an agent, a utility, a tool and/or the like each comprising a plurality of program instructions stored in a non-transitory medium (program store) such as the storage 406 and executed by one or more processors such as the processor(s) 404. For example, the processor(s) 404 may execute an RTB application 410 to conduct RTB processes for serving AD(s) to the client device(s) 202 correlated with respective user(s) 210 in response to RTB requests received from the client device(s) 202. The RTB requests received from the client devices offer for sale impressions at one or more AD placements embedded in online content presented by the client device(s) 202 to associated user(s) 210.

The RTB application 410 may forward the RTB requests to one or more AD exchanges 420 which are automated platforms for managing the trade for the AD impressions. The AD impressions trade is conducted between a plurality of publishers providing the online content and offering for sale the impressions (at the AD placements) and a plurality of advertisers looking to purchase the AD impressions for posting one or more of a plurality of ADs at the respective AD placements. To support real-time trading of the AD impressions, the AD exchange(s) 420 typically communicates with automated platforms associated with the publishers, for example, supply side platforms (SSPs) and/or the like and automated platforms associated with the advertisers, for example, demand side platforms (DSPs) and/or the like.

Optionally, the RTB server 250 is implemented, integrated and/or utilized by one or more of the SSPs such that the SSP(s) may execute the RTB application 410.

Optionally, the RTB server 280 and/or the RTB application 410 executed by the RTB server 280 are implemented as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

As shown at 302, the process 300 starts with the RTB application 260 receiving, from an analyzer such as the analyzer 250, one or more physical (real world) user attributes of one or more of the users 210 detected and/or tracked by the analysis system 240 as described in the process 100. Each of the detected and/or tracked users 210 may be correlated with an identifier of each of one or more client device(s) 202 associated with the respective user 210 as described in the process 100. As such for each detected and/or tracked users 210, the RTB application 260 receives a correlated set of identified physical user attribute(s) and identifier(s) of the client device(s) 202 associated with the respective user 210.

The RTB application 260 may receive the physical user attribute(s) of the user(s) 210 coupled with the correlated client device(s) identifier(s) from the analysis system 240. Additionally and/or alternatively, the RTB application 260 receives the physical user attribute(s) of the user(s) 210 correlated with the client device(s) identifier(s) from one or more of the aggregator server(s) 430 which may receive physical user attribute(s) of the user(s) 210 correlated with the client device(s) identifier(s) from the analysis system 240.

As shown at 304, the RTB application 410 may receive one or more RTB requests offering from one or more of the client devices 202. The RTB request(s) offering for sale impressions at one or more AD placements embedded in online media presented by the respective client device(s) 202 to their associated user(s) 210 further include their identifier (e.g. MSISDN, IMSI, etc.) to allow content publishers to locate and transmit online content item(s) to each client device 202 according to its identifier.

As shown at 306, the RTB application 410 forwards the RTB requests to one or more of the AD exchanges 420. Optionally the RTB application 260 forwards the RTB requests to one or more aggregators of publishers, for example, an SSP which in turn forwards the RTB requests to the AD exchange 420. The AD exchange(s) 420 may conduct a bidding process for the RTB request(s) and receive from one or more of the DSPs bid offers for a respective one of the offered impressions. Each of the bid offers is associated with a respective AD and offers a price to be paid by the advertiser in case the respective AD is converted, for example, viewed by the respective user 210, clicked by the respective user 210, the respective user 210 makes a purchase of the service and/or product offered by the AD and/or the like.

Using the client device(s) 202 identifier available for both each RTB request and for each set of user attribute(s), the RTB application 410 may correlate between RTB request(s) received from one or more of the client device(s) 202 and the physical user attribute(s) identified for the respective user 210 associated with the client device(s) 202.

It is naturally highly desirable to effectively target the ADs for user(s) 210 in order to increase visibility, conversion rate and/or the like. Efficiently targeting users 210 with appropriate ADs may be done by identifying the user attributes of the user(s) 210, specifically the physical (real world) user attributes and selecting the AD(s) accordingly such that the selected AD(s) relates to the physical user attribute(s) of the user 210 and the selected AD(s) is therefore estimated and/or predicted to be most effective, relevant and/or appropriate.

The RTB application 410 may therefore forward the identified user attribute(s) coupled (together) with the correlated RTB request(s) to the AD exchange 420 thus enabling the advertisers to select AD(s) for the user(s) 210 according to their identified user attribute(s).

As shown at 308, the RTB application 410 receives from the AD exchange(s) 420 a plurality of bid offers submitted by the DSP(s) associated, owned, operated and/or the like by one or more advertisers in response to the RTB request(s). The plurality of bid offers is submitted by the advertisers for posting a plurality of respective ADs at the impression offered by the RTB request(s).

The advertiser(s), specifically the DSP(s) may select the AD(s) according to the physical user attribute(s) coupled with one or more of the RTB requests and correlated to the same client device 202.

Several examples for selecting the AD(s) according to the physical user attribute(s) of user(s) 210 in response to RTB request(s) received from client device(s) 202 associated with the user(s) 210 are provided herein after which continue and/or complement the examples presented for the process 100, specifically step 108 of the process 100. The examples may relate to either selecting AD(s) for the detected user 210 while at the registration location as well as for selecting AD(s) for the tracked user 210 tracked after leaving the registration location.

For example, assuming the user attribute(s) include one or more visual attributes identified for a certain user 210. The visual attribute(s) may include, for example, an indication the certain user 210 is wearing a shirt with the log of a certain football club. In such case one or more advertisers may select AD(s) relating to the certain football club, for example, merchandise related to the certain football club, tickets for an upcoming football match of the certain football club, a tour at the stadium of the certain football club and/or the like.

In another example, assuming the user attribute(s) include an indication that a certain user 210 has a company of 2 kids. In such case one or more advertisers may select AD(s) offering products and/or services targeting the kids, for example, a children activity, a fast food restaurant and/or the like. Moreover, the user attribute(s) may indicate an age of one or more of the kids and the advertiser(s) may further adjust the selection of AD(s) offering products and/or services targeting the indicated age(s). Furthermore, assuming the user attribute(s) include an indication that based on the state of mind of a certain user 210, the certain user 210 appears to be exhausted and/or stressed. In such case one or more advertisers may select AD(s) offering one or more very nearby fast food restaurants to allow the certain user 210 some immediate rest.

In another example, assuming the user attribute(s) include one or more audible attributes identified for a certain user 210, for example, a content of speech spoken by the certain user 210. For example, assuming the speech content relates to a certain hobby of the certain user 210, for example, jogging, fishing, guitar playing, video gaming and/or the like. In such case one or more advertisers may select AD(s) offering products and/or services targeting the hobby indicated by the certain user 210, for example, jogging shoes, fishing rods, guitars and/or cord books, video games respectively and/or the like.

In another example, assuming the user attribute(s) include one or more temperature attributes identified for a certain user 210, for example, a body heat of the certain user 210. For example, assuming the detected body temperature of the certain user 210 is high (e.g. 38 degrees Celsius), one or more advertisers may select AD(s) offering one or medicines, therapies and/or the like for treating one or more diseases known to have high body temperature symptoms.

In another example, assuming the user attribute(s) include an indication of one or more activities a certain user 210 is engaged in, for example, jogging, reading a book, using a mobile application, playing a guitar, playing basketball and/or the like. In such case one or more advertisers may select AD(s) offering products and/or services targeting the activity(s) indicated for the certain user 210, for example, jogging shoes, books, mobile applications, guitars and/or cord books, basketball equipment (e.g. balls, apparel, etc.) respectively and/or the like.

As shown at 310, for each RTB request the RTB application 260 initiates service of one or more ADs selected from the plurality of ADs, specifically, AD(s) associated with winning bid offer(s) among the plurality of bid offers. Serving the AD(s) to the appropriate client devices 202 is done according to their identifiers which uniquely identify them and may be used for transmitting them the AD(s).

According to some embodiments of the present invention there are provided methods and systems for verifying an actual conversion of one or more ADs presented to one or more of the users 210 and apply a pay per happening charging for charging the advertiser(s) based on the conversion verification. According to the pay per happening paradigm, the advertiser(s) whose AD(s) was presented to the user(s) 210 are charged for the impression in case the AD(s) is converted, i.e. the user 210 purchases, adds to basket, clicks and/or follows the product(s), service(s) and/or the like offered by the presented AD(s).

The verification of the conversion, for example, a purchase of an item and/or a service offered by one or more ADs presented to one or more of the users 210 as described in the process 300 may be done by an analysis system such as the analysis system 240 executing an analyzer such as the analyzer 250 for analyzing the sensory data captured by one or more sensors such as the sensor 260.

The analyzer 250 may analyze the sensory data captured by the sensor(s) 260 and identify one or more actions of the user(s) 210 either while detected at the physical registration location and/or while tracked in the site. The analyzer 250 may analyze the sensory data to identify one or more actions and/or users attributes of the user(s) 210 which may relate to conversion of the AD(s) presented to the user(s) 210 by their associated (and correlated) client device(s) 202.

Optionally, the conversion verification is done by one or more conversion verification systems (separated from the analysis system 240) which may receive the sensory data from the analyzer 250 and may analyze the sensory data to identify the conversion. Additionally and/or alternatively, rather than receiving the sensory data from the analyzer 250, the conversion verification system(s) receive an indication of the actions and/or users attributes of the user(s) 210 and identify the conversion accordingly.

For example, assuming one or more of the ADs selected and presented to a certain user 210 advertise a certain restaurant located at the site. Further assuming that, based on analysis of the sensory data, the analyzer 250 identifies the certain user 210 is located at the certain restaurant and moreover, the analyzer 250 identifies the certain user 210 is eating at the certain restaurant. In such case the analyzer 250 may verify that the AD(s) is converted and may issue an indication of the conversion to one or more charging systems adapted to charge the respective advertiser upon conversion of the AD(s).

In another example, assuming one or more of the ADs selected and presented to a certain user 210 advertise certain apparel (e.g. a shirt, a hat, etc.) available for sale at the site. Further assuming that, based on analysis of the sensory data, the analyzer 250 identifies the certain user 210 is wearing the apparel. In such case the analyzer 250 may verify that the AD(s) is converted and may issue an indication of the conversion to one or more charging systems adapted to charge the respective advertiser upon conversion of the AD(s).

It is expected that during the life of a patent maturing from this application many relevant systems, methods and computer programs will be developed and the scope of the terms client device, SSP and DSP are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of analyzing real world information of users to derive user attributes used for selecting online content for presentation by client devices correlated with the users, comprising:

capturing, by at least one sensor deployed to monitor the physical registration location, sensory data including images of the physical registration location;

detecting a presence of a user in the physical registration location by analyzing the sensory data, the physical registration location being a location at which the user registers to enter a particular area;

receiving, from the user, an identifier of the user in association with the user registering to enter the particular area;

capturing, by at least one receiver deployed to capture only transmissions originating from the registration location, signals transmitted by a network connected client device associated with the user while the user's presence is detected at the physical registration location;

determining an identifier of the network connected client device from the signals;

storing, in a database, a correlation between the identifier of the user and the identifier of the client device;

identifying at least one user attribute of the user by analyzing the sensory data, the at least one user attribute including a particular appearance of the user;

correlating the at least one user attribute of the user with the identifier of the client device;

receiving a real-time bidding request from the client device, the real-time bidding request offering for sale impressions at one or more advertisement placements embedded in online media presented by the client device to the user and the real-time bidding request including the identifier of the client device;

responsive to receiving the real-time bidding request from the client device, determining the at least one user attribute of the user according to the correlation of the at least one user attribute of the user with the identifier of the client device included in the real-time bidding request;

transmitting one or more additional real-time bidding requests together with the at least one user attribute coupled with the identifier of the client device to one or more remote servers;

receiving, from the one or more remote servers, a plurality of bid offers from advertisers for a plurality of online content items to be served to the client device;

selecting at least one online content item from the plurality of online content items, based on the plurality of bid offers and the at least one user attribute of the user;

initiating service of the selected at least one online content item to the client device, according to the identifier of the client device, for presentation to the user;

tracking the user, after the user leaves the physical registration location, by:
  capturing, by at least one additional sensor deployed to monitor one or more additional locations within the particular area, additional sensory data including images of the one or more additional locations;
  detecting a presence of the user at the one or more additional locations within the particular area by analyzing the additional sensory data;
  analyzing the additional sensory data to determine one or more actions of the user which verify a conversion of a particular online content item of the at least one online content item served to the client device; and
  causing an advertiser associated with the particular online content item to be charged, responsive to verifying the conversion of the particular online content item;
  wherein the at least one sensor is physically and communicatively disconnected from the client device.

2. The computer implemented method of claim 1, further comprising maintaining the correlation between the identifier of the user and the identifier of the client device for a limited time duration, wherein the correlation is discarded at the end of the time duration.

3. The computer implemented method of claim 2, wherein the correlation is maintained until the user leaves the particular area.

4. The computer implemented method of claim 1, wherein the signals originating from the client device include signals broadcast from the client device which include the identifier of the client device, the identifier of the client device being at least one of:
  a Mobile Station International Subscriber Directory Number (MSISDN),
  international mobile subscriber identity (IMSI), or
  an internet protocol (IP) address.

5. The computer implemented method of claim 4, wherein the signals are broadcast via one or more wireless communication channels.

6. The computer implemented method of claim 1, wherein the particular appearance of the user includes clothing worn by the user and a facial expression of the user.

7. The computer implemented method of claim 1, wherein the signals transmitted by the client device are captured using a plurality of receivers that allow triangulation of the signals to the physical registration location to verify that the signals originate from the client device while the user's presence is detected at the physical registration location.

8. The computer implemented method of claim 1, wherein the signals transmitted by the client device are captured using a directed receiver deployed to capture only transmissions originating from the registration location to verify that the signals originate from the client device while the user's presence is detected at the physical registration location.

9. The computer implemented method of claim 1, wherein the particular online content item is an advertisement of a restaurant located in the particular area, and wherein the one or more actions of the user which verify the conversion of the advertisement includes the user being located at the restaurant and the user eating at the restaurant.

10. The computer implemented method of claim 1, wherein the particular online content item is an advertisement for certain apparel available for sale at the particular area, and wherein the one or more actions of the user which verify the conversion of the advertisement includes the user wearing the certain apparel.

11. An analysis system for analyzing real world information of users to derive user attributes used for selecting online content for presentation by client devices correlated with the users, comprising:
  a storage storing a code; and
  at least one processor coupled to the storage for executing the stored code, the code comprising:
    code instructions to capture, by at least one sensor deployed to monitor the physical registration location, sensory data including images of the physical registration location;
    code instructions to detect a presence of a user in the physical registration location by analyzing the sensory data, the physical registration location being a location at which the user registers to enter a particular area;
    code instructions to receive, from the user, an identifier of the user in association with the user registering to enter the particular area;
    code instructions to capture, by at least one receiver deployed to capture only transmissions originating from the registration location, signals transmitted by a network connected client device associated with the user while the user's presence is detected at the physical registration location;
    code instructions to determine an identifier of the network connected client device from the signals;
    code instructions to store, in a database, a correlation between the identifier of the user and the identifier of the client device;
    code instructions to identify at least one user attribute of the user by analyzing the sensory data, the at least one user attribute including a particular appearance of the user;
    code instructions to correlate the at least one user attribute of the user with the identifier of the client device;

code instructions to receive a real-time bidding request from the client device, the real-time bidding request offering for sale impressions at one or more advertisement placements embedded in online media presented by the client device to the user and the real-time bidding request including the identifier of the client device;

code instructions to, responsive to receiving the real-time bidding request from the client device, determine the at least one user attribute of the user according to the correlation of the at least one user attribute of the user with the identifier of the client device included in the real-time bidding request;

code instructions to transmit one or more additional real-time bidding requests together with the at least one user attribute coupled with the identifier of the client device to one or more remote servers;

code instructions to receive, from the one or more remote servers, a plurality of bid offers from advertisers for a plurality of online content items to be served to the client device;

code instructions to select at least one online content item from the plurality of online content items, based on the plurality of bid offers and the at least one user attribute of the user;

code instructions to initiate service of the selected at least one online content item to the client device, according to the identifier of the client device, for presentation to the user;

code instructions to track the user, after the user leaves the physical registration location, by:
  code instructions to capture, by at least one additional sensor deployed to monitor one or more additional locations within the particular area, additional sensory data including images of the one or more additional locations;
  code instructions to detect a presence of the user at the one or more additional locations within the particular area by analyzing the additional sensory data;

code instructions to analyze the additional sensory data to determine one or more actions of the user which verify a conversion of a particular online content item of the at least one online content item served to the client device; and code instructions to cause an advertiser associated with the particular online content item to be charged, responsive to verifying the conversion of the particular online content item;

wherein the at least one sensor is physically and communicatively disconnected from the client device.

* * * * *